United States Patent
Yembari et al.

(10) Patent No.: US 11,880,753 B1
(45) Date of Patent: Jan. 23, 2024

(54) SYSTEM AND METHOD FOR DETERMINING APPLICATION USAGE

(71) Applicant: ZLURI TECHNOLOGIES PRIVATE LIMITED, Hyderabad (IN)

(72) Inventors: Chaithanya Yembari, Hyderabad (IN); Sethu Meenakshisundaram, Hyderabad (IN); Ritish Reddy, Hyderabad (IN); Chinmay Panda, Hyderabad (IN); Vanketesh Kumar, Hyderabad (IN)

(73) Assignee: ZLURI TECHNOLOGIES PRIVATE LIMITED, Hyderabad (IN)

(*) Notice: Subject to any disclaimer, the term of this patent is extended or adjusted under 35 U.S.C. 154(b) by 0 days.

(21) Appl. No.: 18/082,364

(22) Filed: Dec. 15, 2022

(30) Foreign Application Priority Data

Oct. 19, 2022 (IN) .............................. 202241059873

(51) Int. Cl.
| | |
|---|---|
| G06F 15/16 | (2006.01) |
| G06N 20/00 | (2019.01) |
| G06F 16/25 | (2019.01) |
| H04L 67/50 | (2022.01) |

(52) U.S. Cl.
CPC ........... G06N 20/00 (2019.01); G06F 16/258 (2019.01); H04L 67/535 (2022.05)

(58) Field of Classification Search
CPC ........ G06N 20/00; G06N 7/02; G06F 16/258; G06F 16/1794; H04L 67/535
USPC ......................................... 709/203, 201, 217
See application file for complete search history.

(56) References Cited

U.S. PATENT DOCUMENTS

| | | | |
|---|---|---|---|
| 9,009,289 B1* | 4/2015 | Jacob .................. | H04L 67/1029 709/224 |
| 9,591,088 B2 | 3/2017 | Hyman et al. | |
| 10,671,932 B1* | 6/2020 | Chen ....................... | G06N 5/04 |
| 10,713,030 B2 | 7/2020 | Borthakur et al. | |
| 11,386,490 B1* | 7/2022 | Plante ..................... | G06N 20/00 |
| 2013/0132435 A1* | 5/2013 | Yeung .................... | G06F 16/283 707/776 |

(Continued)

OTHER PUBLICATIONS

G2Track website by G2.com Inc. at 100 S. Wacker Dr. Ste. 600, Chicago, IL 60606.

*Primary Examiner* — Kaylee J Huang
(74) *Attorney, Agent, or Firm* — Shumaker, Loop & Kendrick, LLP

(57) ABSTRACT

A system and a method for determining application usage is disclosed. The system may receive activity data for one or more applications from a plurality of sources in a raw format. The plurality of sources comprises Single Sign-on Integration (SSO), direct application integration, Browser Agents, Desktop Agents, and financial integration. Further, the system may create a master data by parsing the activity data. The master data may be enriched with organization data, department data, application data, and billing data. Subsequently, the system may calculate weights for each source and for each activity for each application using Machine Learning (ML) algorithms. Further, a regression model may be trained based on the master data and the weights assigned to each source for each activity. Generating a usage score for each application at a user level, a department level, and an organizational level based on the trained regression model.

18 Claims, 3 Drawing Sheets

(56) References Cited

U.S. PATENT DOCUMENTS

2015/0186133 A1     7/2015   Yarra et al.
2022/0413956 A1*   12/2022   Mathew .............. G06F 11/3452

* cited by examiner

SYSTEM AND METHOD FOR DETERMINING APPLICATION USAGE

PRIORITY INFORMATION

The present application claims priority from the Indian application no. 202241059873 dated 19 Oct. 2022.

TECHNICAL FIELD

The present subject matter described herein, in general, relates to determining application usage, and, more particularly, to determining application usage at a user level, a department level, and an organizational level.

BACKGROUND

Software applications are essential to the operation of the majority of contemporary businesses. A software application is a type of computer program that performs a specific function. It is designed to help end-users with specific tasks, simplify workflows, and improve communication across teams. From applications that enable the operation of the computer to applications that render real-time communications to custom applications for specialized business tasks, Enterprises are increasingly dependent on them to carry out their businesses. Many of these applications come with a cost and may require a licence for use. Consequently, the software applications may incur huge costs to the enterprises despite the benefits they provide. Ideally, a business would evaluate whether an application is sufficiently utilised and whether the use of expensive software justifies continued investment and maintenance, for example, in both capital expenditures (CAPEX) and operational expenditures (OPEX). Such transparency may assist the enterprise in optimising the number of subscriptions/licences required to maintain business operations while at the same time saving costs. Based on this analysis, the business may decide, for instance, to discontinue the software application or to optimise the number of subscriptions to it. However, since the applications are owned and licenced by different vendors using disparate technologies, currently it is difficult if not impossible to track and analyse application usage at a granular level. Accordingly, there is a need for more granular and transparent systems and methods to assess application usage centrally. These systems and methods can reduce costs, tailor licences, and improve operational efficiency.

SUMMARY

Before the present system(s) and method(s), are described, it is to be understood that this application is not limited to the particular system(s), and methodologies described, as there can be multiple possible embodiments that are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for determining application usage. This summary is not intended to identify essential features of the claimed subject matter, nor is it intended for use in determining or limiting the scope of the claimed subject matter.

In one implementation, a method for determining application usage is disclosed. The method involves receiving activity data for one or more applications from a plurality of sources in a raw format. The activity data may correspond to information on one or more activities performed by a set of users with respect to the one or more applications. Further, master data may be created by parsing the activity data. Furthermore, organization data, department data, application data, and billing data may be received from the plurality of sources. Subsequently, the master data may be enriched with the organization data, the department data, the application data, and the billing data. Further, the method may comprise dynamically calculating weights for each source of the plurality of sources and for each activity of the one or more activities for each application using Machine Learning (ML) algorithms. The weights are calculated by the ML algorithms based on the frequency of the activity data received from each source for each activity. Further, a regression model may be trained based on the_master data and the weights assigned to each source for each activity. Furthermore, a usage score may be generated for each application at a user level, a department level, and an organizational level based on the trained regression model. In one aspect, the aforementioned method for determining application usage may be performed by a processor using programmed instructions stored in a memory.

In another implementation, a non-transitory computer-readable medium embodying a program executable in a computing device for determining application usage is disclosed. The program may comprise a program code for receiving activity data for one or more applications from a plurality of sources in a raw format. The activity data corresponds to information on one or more activities performed by a set of users with respect to the one or more applications. Further, the program may comprise a program code for creating master data based on parsing the activity data. Subsequently, the program may comprise a program code for receiving organization data, department data, application data, and billing data from the plurality of sources. Further, the program may comprise a program code for enriching the master data with the organization data, the department data, the application data, and the billing data. Furthermore, the program may comprise a program code for dynamically calculating weights for each source of the plurality of sources and for each activity of the one or more activities for each application using Machine Learning (ML) algorithms. It may be noted that the weights are calculated by the ML algorithms based on frequency of the activity data received from each source for each activity. The program may comprise a program code for training a regression model based on the_master data and the weights assigned to each source for each activity. Finally, the program may comprise a program code for generating a usage score for each application at a user level, a department level, and an organizational level based on the trained regression model.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for determining application usage disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

Figure 1:
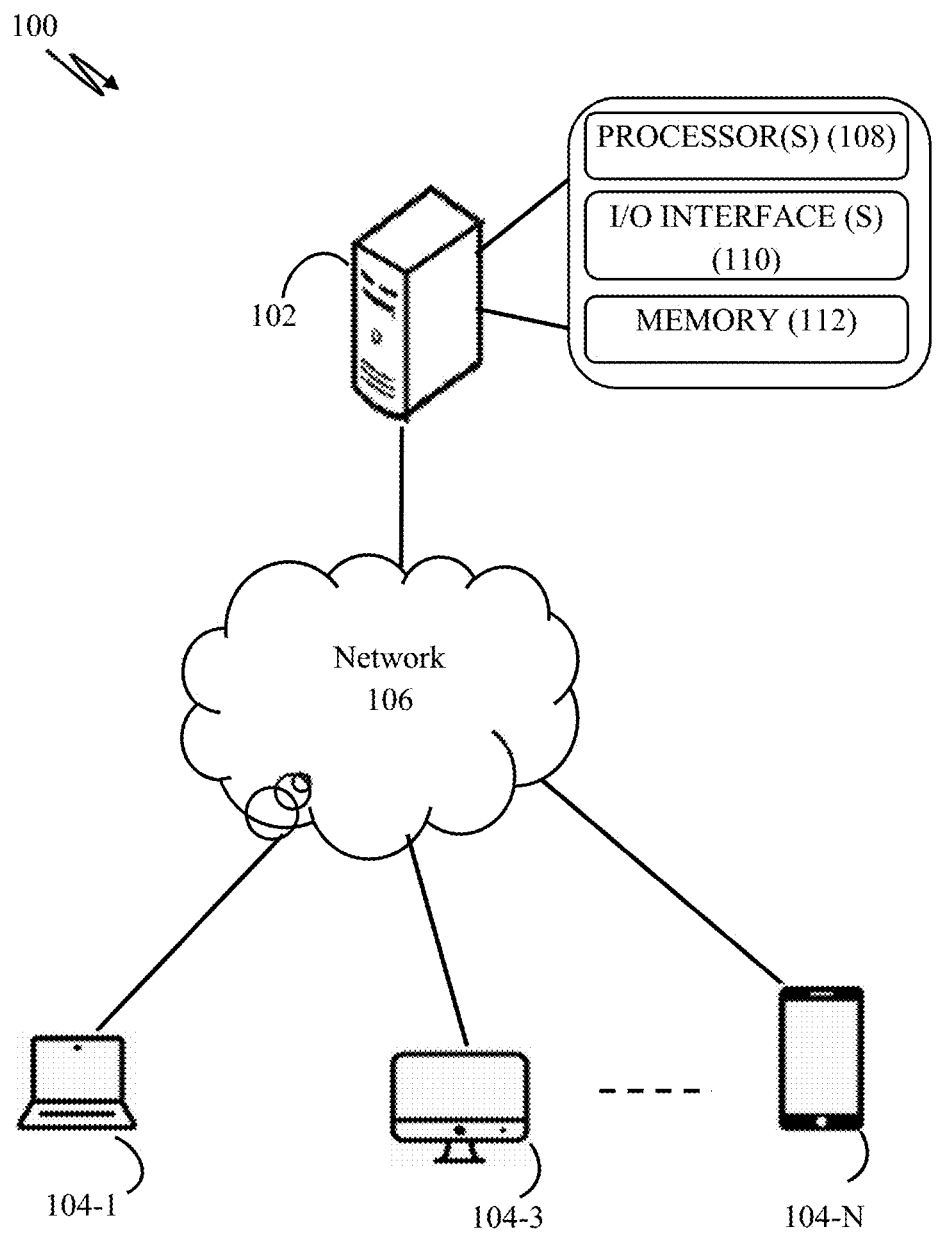
FIG. 1 illustrates a network implementation for determining application usage, in accordance with an embodiment of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "creating," "enriching," "calculating," "generating," "training," and other forms thereof, are intended to be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for determining application usage at a user level, a department level, an organization level, and an industry level. The usage score is a metric that provides, in quantifiable terms, a measure of the extent of utilization of an application or a paid license. It is also a qualitative metric in that it qualifies the degree of engagement of a user, a department or organization with an application. Further, the usage scores signify the value derived from the application. The application with a low usage score across all departments could mean low engagement with the application. The low usage scores may open opportunities to identify the reasons for employees' low engagement with the application, re-evaluate the application's utility, or search for an alternative to the application that would generate better engagement and bring more value.

The system may calculate the usage score based on activity data received from the plurality of sources for each user for each application. The activity data or activity streams are logs or events generated by the system for each of the users using the applications. The activity streams coming from the plurality of sources (single sign on integration, direct application integrations, Browser Agents, Desktop Agents, and Financial Integration) are used to qualitatively determine the extent to which applications are being used in the organization. The data received from the plurality of sources is transformed and merged/stitched by using several coordinated Extract, Transform, and Load (ETL) pipelines. In addition, the system may run aggregation pipelines (merging activity data) across the plurality of sources and store them at a user level.

Further, the merged data or master data is enriched with organization data, department data, application data, and billing data. Furthermore, the enriched data is used to train a regression model. In an embodiment, the regression model may be trained using the most recent activity data, such as the activity data for the last six months, to compute usage score for the current month's data.

It may be noted that the system may determine the value of an application at three levels—user, department, organization-wide. Each of the scores determine the engagement of the employees within that level with an application. Let's say the usage score for a user for an application for three consecutive months has been X, Y, Z, then:

If Z>Y>X—It means that the user's engagement with the application has been on the rise, which could mean more the application adds value to the user.

If Z<Y<X—It could mean a gradual decrease in the application and the application is not adding value to the user.

If the scores remain more or less the same over months, it could mean that the application has been consistently being used to achieve certain regular objectives.

If the usage score is consistently 0, it means that the application is not used as it doesn't add any value to the user's day-to-day deliverables.

Referring now to FIG. 1, a network implementation 100 of a system 102 for determining application usage is disclosed. Initially, the system 102 receives activity data for one or more applications from a plurality of sources in a raw format. In an example, the software may be installed on a user device 104-1. It may be noted that the one or more users may access the system 102 through one or more user devices 104-2, 104-3 . . . 104-N, collectively referred to as user devices 104, hereinafter, or applications residing on the user devices 104. The system 102 receives activity data for one or more applications from a plurality of sources in a raw format from one or more user devices 104. Further, the system may also 102 receive a feedback from a user using the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for determining application usage. At first, a user may use the user device 104 to access the system 102 via the I/O interface 110. The user may register the user devices 104 using the I/O interface 110 in order to use the system 102. In one aspect, the user may access the I/O interface 110 of the system 102. The detail functioning of the system 102 is described below with the help of figures.

The system as described herein is configured to execute a set of instructions to determining application usage at a user level, a department level and an organizational level. The system may receive activity data for one or more applications from a plurality of sources in a raw format. These applications also popularly known as Software as a Service (SaaS) applications or on demand software. Users can connect to and use these cloud-based applications online as they are centrally hosted. The activity data is received from variety of sources and in a huge volume. It may be noted that the plurality of sources may comprise Single Sign-on Integration (SSO), direct application integration, Browser Agents, Desktop Agents, and financial integration.

In an example and not by way of any limitation, user authentication tools like Google®, Okta®, Microsoft Azure®, and the like are examples of SSO Integration tools. It may be noted that the activity data received from each SSO integration is different. For example, the activity data received from Google® may comprise an application ID, a primary email, name, last login time, and a customer ID. Further, the activity data received from Microsoft Azure® may comprise city, company name, department, display name, and fax number.

Further, the direct application integration means having integration with an application provider itself. The direct application integration provides a more granular level of detail when compared to the SSO Integration. For example, the system may receive activity data directly from Slack®, Zoom®, and many other third-party applications. Further, an example of the browser agent could be extensions installed on a web browser. The system may receive the activity data from the extensions installed on a user's device. Further, an example of the Desktop Agents may be applications (like Adobe® software) installed on the user's device. Furthermore, an example of the financial integration may be software related to expense management (like Expensify®). The financial integration captures transaction details related to the application, such as the amount and date on which the transaction was done. Further, this information is mapped with the corresponding application against which the particular transaction was done.

The activity data corresponds to information on one or more activities performed by a set of users with respect to the one or more applications. The activity data may comprise at least application logs, a unique identifier related to an application, login information, logout information, timestamp of the activity, count of messages, count of attachments sent by the user in a period, demographic detail of the user, and license information of the application.

Consider an example, there are thousands of employees working in an organization. The system may be installed in an admin's device or in each employee's device. The system is configured in a way that the system receives activity data of each employee from the plurality of sources. In an example, the activity data of an employee received from the direct application integration may comprise—a user ID, user details such as name, email ID, company name, division, department, contact details, application name, license details, and details related to messages and attachments sent by the employee. It may be noted that the system receives activity data from the plurality of sources for thousands of employees. Since the volume of the activity data is huge, the system may dynamically allocate one or more cloud servers to process the data.

It may be noted that the SSO, which is a session and user authentication service lets users utilize one set of login credentials to access multiple applications. The SSO integration, in this case, when integrated directly with the identity providers like OKTA®, Microsoft Azure®, and Google's G Suite® will provide one set of credentials like username and password to access different applications. Additionally, this integration also provides activity data related to different applications used, such as usage patterns of these applications, type of application, security standards, access rights, etc. The SSO integration may obtain this type of information with publicly available APIs. Additionally, the audit logs are also made available for obtaining different insights on system activities for compliance, such as the date and time of any activity, the owner of any activity, the category of activity, and so on. A typical SSO platform operates in the below sequence:

a) A user visits the service provider's application or websites like Slack® or Zoom®.
b) The service provider sends the SSO platform, (Identity Provider), for example, Microsoft Azure®, a token containing user information, like their email address, to authenticate the user.
c) The Identity Provider first checks if the user has been authenticated; if so, it grants access to the Service Provider application and skips to Step e).
d) If the user hasn't logged in, they'll be asked for the Identity Provider's credentials. This could be a username and password or One Time Password (OTP).
e) After validating the credentials, the Identity Provider sends a token to the Service Provider to confirm authentication.
f) The user's browser sends the service provider this token.
g) The service provider validates the token based on the trust relationship set up during the initial configuration, and then the user can access the service provider's web/application.

Similarly, the direct application integration platform is a direct means to access application insights and obtain application activity data such as the amount of time spent, and the type of features used by any given user of the application. The direct application integration basically allows to understand how software components/features and users interact. There are two major elements that enable the direct application integration operation, they are: Application Programming Interface (API), and activities and actions tracking. An API is a collection of functions and procedures that define how software components should interact with one another. The APIs enable users to easily and quickly access the functionality of other software via well-defined data structures. Also, the activities and action tracking element in application integration platforms tracks different actions for example an in-app purchase has been made by any user then it results in a series of actions due to this activity initiated by the user. As a result, all the actions corresponding to any activity are tracked.

Further, the financial integration platform enables the access to financial systems of an organization for example Expensify®, Quickbook® and Netsuite®. When the SSO integration is unable to provide/track information on financial transaction as some purchases might have been done on employee's personal credit/debit cards, in such situations, the financial integration module with help of APIs would be able to interact with data obtained from financial systems and would map the data with respective apps against which any payment is done.

In some embodiments, the system may receive the activity data from the browser agents and the desktop agents. Browser extensions or the browser agents would be helpful in capturing the websites visited by the employees. The data captured by browser extensions may include URL, title, timestamp of opening and closing of the tab, etc. The browser agents/extensions may be obtained for some of the popular web browsers such as Chrome®, Firefox®, and Microsoft Edge®. Similarly, the desktop agents would be able to capture information such as different apps installed on an employee's system, sign-in and sign-out details on the applications, device level information like product ID, Internet Protocol (IP) addresses, and hardware information and apps running in the background. In this manner, all these integrations together may help in extracting insights about the usage of multiple applications. All these integrations, including the SSO integration, the direct application integration, the financial integration, the browser extension, and the desktop agents, may provide a large volume and variety of data which may be in the form of structured, unstructured, and semi-structured data. The activity data received from a plurality of sources help in extracting intelligent insights on different applications used in an organization. Additionally, these insights may help in making some key business decisions that may help in running an organization in a more efficient manner.

Further to receiving the activity data, the system 102 may transform the activity data into a standardized format using a fuzzy matching process. The transformation comprises at least matching non-standardized email or an identifier to a unique identifier for the user and matching non-standardized application names to a unique application name. In an example, the system may receive the activity data from the SSO integration comprising the application name as JDapp. Further, the direct application integration may provide the application name as JD. Furthermore, the financial integration may comprise the application name as the name of the parent company. Let us assume as John Doe Inc. After receiving the activity data from the plurality of sources, the system transforms the activity data into a standardized format using the fuzzy matching process. In the above example, the transformed data may comprise the application name as JD. Similarly, the system also transforms, the email ID received from the plurality of sources.

Further to transforming the activity data, the system may create master data based on parsing the activity data. In other words, the system may compile the activity data received from the plurality of sources in one file. It may be noted that the activity data received from each source is in different format. In an embodiment, the SSO integration may provide logs in the form of the activity data, whereas the direct application integration may provide activity data in structured format (e.g. table). The system further transforms the activity data and then creates a master data by mapping the activity data received from the plurality of sources for an application. Let us assume that the system receives the activity data for Application P from the SSO integration, the direct application integration and the financial integration. Further, the system transforms the received activity data and then creates master data comprising activity data received from the SSO integration, the direct application integration and the financial integration. It may be noted that the system may remove the duplicate activity data entry from the master data.

Further to creating the master data, the system may receive organization data, department data, application data, and billing data from the plurality of sources. The organization data may comprise a number of application integrations, a number of application licenses held by an organization, and a type of application licenses. The department data may comprise information relating to one or more applications used by a particular department. The application data may comprise license detail, device information and the billing data may comprise payment information related to applications/softwares. In an example and not by way of any limitation, the organization data, department data, application data, and billing data may be prestored in the system.

Subsequently, the system may enrich the master data with organization data, department data, application data, and billing data. The enrichment may comprise adding user level details in the master data, and wherein the user level details comprise department details, license details, and device details. It may be noted that the master data comprises the activity data received from the plurality of sources. Further, the system may add more information in the master data to enrich the data. In an example and not by way of any limitation, the enriched_data may comprise a user identification number, an application identification number, activity type, organization identification number, department identification number, license identification number, device identification number, year, month, date, activity count, and timestamp.

Further to enriching the master data, the system may dynamically calculate weights for each source of the plurality of sources and for each activity of the one or more activities for each application using Machine Learning (ML) algorithms. In other words, the weights are calculated by the ML algorithms based on frequency of the activity data received from each source for each activity.

It may be noted that the weights are calculated per integration and activity type used in training the regression model so that the impact of the activities are according to their importance (volume). In an example and not by way of any limitation, the table of weights may comprise an organization identification number, an integration identification number, activity type, and weight. It may be noted that the weights may be calculated on the basis of how frequent the integration generates the activity data.

Subsequently, the system may train a regression model based on the master data and the weights assigned to each source for each activity. The regression model may be a Generalized Linear Model (GLM). It may be noted that the regression model is iteratively trained when new activity data streams are received. Further, the distribution type of the model may be a Poisson Distribution. Poisson Distribution is helpful in training when the activity counts are involved.

In an embodiment, the system may assign a weight to each source or integration type from the plurality of sources. For instance, weights can be provided on scale of 0-10, with 0 indicating lowest importance and 10 indicative of highest importance. In an example scenario, when the SSO integration data comprises less activity count the weights may be allocated on lower side and relatively higher weights are provided to the direct application integration data (because of higher activity count) for training the regression model. These weights may be applied by the system automatically based on a historic confidence or credibility of the data sources. This weight applying technique may help the system operate efficiently as on certain occasions the processing power and time of the system would be saved by simply not considering the low weight sources.

Further, the system may generate a usage score for each application at a user level, a department level, and an organizational level based on the trained regression model. It may be noted that the usage score may be generated as a factor of at least one of:
  i. a volume of activity of the application over time
  ii. a volume of logins of the application over time
  iii. a volume of usage of other applications iv. a volume of usage of other applications in the same category
  v. a volume of usage of the application across organizations in the same industry
  vi. size of the organization
  vii. age of the organization
  viii. number of departments
  ix. application to company ratio
  x. apps to department ratio
  xi. last n months payments for the application
  xii. last n months payments across all the applications; and
  xiii. department budget In an embodiment, the department level usage score may provide significance of the application to a department from one or more departments present in the organization. Further, the user level usage score may provide number of users using the application and the number of users not using the application frequently.

In an example, let us assume that the trained regression model predicts a score of 70 (on a scale of 0-100) for a user. In that case, it means that the activity pattern suggests that the user is using the application better than 70% of other users who use that application globally. In other words, the user is using the application better than 70% of other users (globally/worldwide) who uses the same application. Further, the system also performs a similar analysis on an organization level as well, where a score of 70 would mean that an employee/a user is using the application better than 70% of the other employees/users who use that application within the organization.

It may be noted that the system calculates usage scores at different levels—user, department, organization, and industry. This helps to analyze an application's effectiveness within a department, an organization, and also to determine the industry standard. The system may predict the below inferences using the different levels of the usage score:
  i. Determining a department that effectively uses an application. This helps to predict a value of an application to the department.
  ii. Identifying users within the same department that uses an application more than the other users, and whether that aligns with the roles and responsibilities of the individuals. If some users tend to use the application less often, it could become a signal for the managers to motivate them to use the application more extensively. The system may recommend training videos to users having lower user-level usage scores. In some instances, the system may recommend reducing the number of subscriptions to save cost.

When the organization level usage score is less, the system may determine that there may be fundamental difficulties across the organization in adopting the application. This could be a signal for the decision makers or the admin to address those difficulties and adopt a completely different set of tools. In such instances, the system may refer an alternative application to the decision makers or the admin.

In an embodiment, the system may recommend training videos to users having less user-level usage scores. Let us assume that when users/employees score below a predefined threshold, the system may automatically recommend training videos to the users. Further, a new application may be recommended to an admin when the organizational level usage score of the application is less than a defined threshold. Let us assume that the organizational level usage score of Application P is 20. In such scenarios, the system may recommend the new application to an admin of the organization. In the example, let us assume that Application P is related to communication and more particularly to a video calling application. In such scenario, the system may recommend an alternative to Application P to the admin.

In an embodiment, the system may extrapolate the activity count for the organization based on activity count of other organizations in the same industry, when the activity data from the direct application integration for the application is not available. Let us assume that Organization X, Organization Y, and Organization Z are using Application Z for sales management and the system has direct application integration with Application Z for Organization X, Organization Y, and Organization Z. Further, let us assume that Organization A, also uses Application Z, who is from the same industry as Organization X. Furthermore, suppose the system does not have direct application integration with Application Z for organization A. In such scenario, the system may extrapolate the activity count for organization A based on the activity count of organizations X, Y, and Z. Let's assume that the activity count of organization X, Y, and Z for application Z is in the range of 100-150. The system may assume that for organization A the application count would be in the similar range.

In other words, when the system already has activity data for Organization X, Y, and Z, the system may learn the correspondence between the SSO integration data and the direct application integration data. The system may use the same correspondence to extrapolate and enrich Organization A's activity data, even without the data from direct application integration.

In yet another embodiment, the system may compare the organizational level usage score of two organizations to infer a tool stack of an organization. For example, when Organization A chooses a software framework or ecosystem more than other alternatives, the usage scores will show a clear bias towards the tools within the ecosystem.

Let's take an example of internal communication & collaboration.

| Application | Usage Score |
|---|---|
| Organization A | |
| MS Teams ® | 85 |
| Slack ® | 25 |
| SharePoint ® | 70 |
| Notion ® | 30 |
| MS Office ® | 80 |
| Organization B | |
| MS Teams ® | 15 |
| Slack ® | 90 |
| SharePoint ® | 10 |
| Notion ® | 80 |
| MS Office ® | 15 |

In this case, Organization A is certainly more inclined toward using the Microsoft Office® ecosystem for communication and collaboration. On the other hand, Organization B is not a part of an ecosystem but chooses to cherry-pick tools that do not necessarily belong to the ecosystem. A comparative analysis between these two organizations may produce an indication of the worthiness/value of an ecosystem over cherry-picking, and vice versa. It may be noted that the comparison may be used to recommend a set of applications to an organization by comparing the usage scores of organizations in the same industry.

In yet another embodiment, the system may also compute cost attribution for pay per use applications. There are many applications that bill organizations according to the usage (pay per use). Such applications are difficult to analyze in order to compute the application's cost effectiveness across departments. These applications generally send out a single invoice with all the billing components. It becomes difficult to understand which departments spend the most out of the cost, and whether it is a worthy expenditure for the department.

It may be noted that the system already has the activity data at a user level, and thus, the system can attribute the fractions of the expenditure to the exact user (and eventually aggregated to the department). It means that for a $100 invoice, the system may predict a list of users who spent the money and whether it was an effective expenditure. This granularity of cost attribution unlocks several opportunities to optimize spends.

For example, if an organization incurred an expenditure of $100, the system may predict the list of users who spent the money and departments (for pay-per-use models):

| User | Department | Usage | Cost Attributed |
|---|---|---|---|
| User A | Dept X | 10 | $10 |
| User B | Dept X | 30 | $30 |
| User C | Dept Y | 60 | $60 |

In the above example, User C from Department Y used the application more as compared to other users. Further, the department X spent $40 and department Y spent $60, out of the $100. The above data may be useful in optimizing the spends. For example, let us assume that an application costs $50 per month. Because the amount of application usage of User C is high, the system may recommend, for User C, switching from pay-per-use pricing model to pay-as-you go pricing model.

In yet another embodiment, the system may uplift or down lift the organizational level usage scores. In order to make the usage scores for an application comparable across different organization, the system may calibrate the organizational scores to reflect organization's specifications like organization size and volume of employee engagement with applications. This helps to get a score that can be compared with other organizations, irrespective of the organizational differences.

Figure 2:
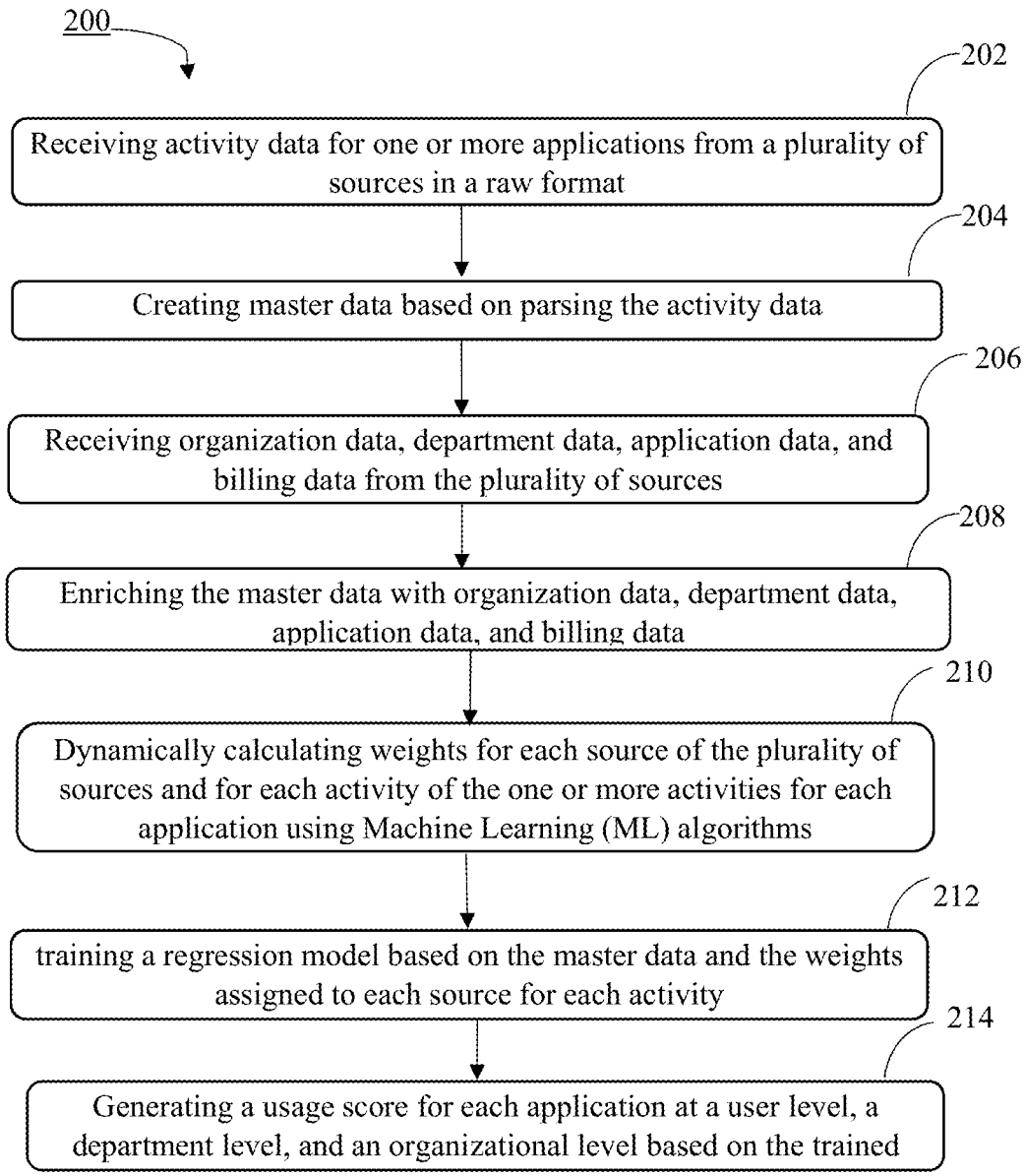
FIG. 2 illustrates a method for determining application usage, in accordance with an embodiment of the present subject matter.

Referring now to FIG. 2, a method 200 for determining application usage is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for determining application usage. Furthermore, the method 200 for determining application usage can be implemented in any suitable hardware, software, firmware, or combination thereof. However, for ease of explanation, in the embodiments described below, the method 200 may be considered to be implemented in the above-described system 102.

At block 202, the activity data for one or more applications from a plurality of sources in a raw format may be received. The plurality of sources comprises Single Sign-on Integration (SSO), direct application integration, Browser Agents, Desktop Agents, and financial integration. Further, the activity data corresponds to information on one or more activities performed by a set of users with respect to the one or more applications. The activity data comprise at least application logs, a unique identifier related to an application, login information of a user, demographic detail of the user, and license information of the application. It may be noted that the activity data may be transformed into a standardized format using a fuzzy matching process. The transformation comprises at least matching non-standardized email or an identifier to a unique identifier for the user and matching non-standardized application names to a unique application name.

At block 204, master data may be created based on parsing the activity data.

At block 206, organization data, department data, application data, and billing data may be received from the plurality of sources.

At block 208, the master data may be enriched with organization data, department data, application data, and billing data. It may be noted that the enrichment comprises adding user level details in the master data. Further, the user level details comprise department details, license details, and device details.

At block 210, weights for each source of the plurality of sources and for each activity of the one or more activities for each application may be dynamically calculated using Machine Learning (ML) algorithms. The weights may be calculated by the ML algorithms based on frequency of the activity data received from each source for each activity.

At block 212, a regression model may be trained based on the master data and the weights assigned to each source for each activity. The regression model may be a Generalized Linear Model (GLM). Further, the regression model is iteratively trained when new activity data streams are received.

At block 214, a usage score for each application at a user level, a department level, and an organizational level may be generated based on the trained regression model. It may be noted that the department level usage score provides significance of the application to a department from one or more departments present in the organization. Further, the user level usage score provides a number of users using the application and the number of users not using the application frequently. It may be noted that the usage score is generated as a factor of at least one of a volume of activity of the application over time, a volume of logins of the application over time, a volume of usage of other applications, a volume of usage of other applications in the same category, a volume of usage of the application across organizations in the same industry, size of the organization, age of the organization, number of departments, apps to company ratio, apps to department ratio, last n months payments for the application, last n months payments across all the applications, and department budget.

Figure 3:
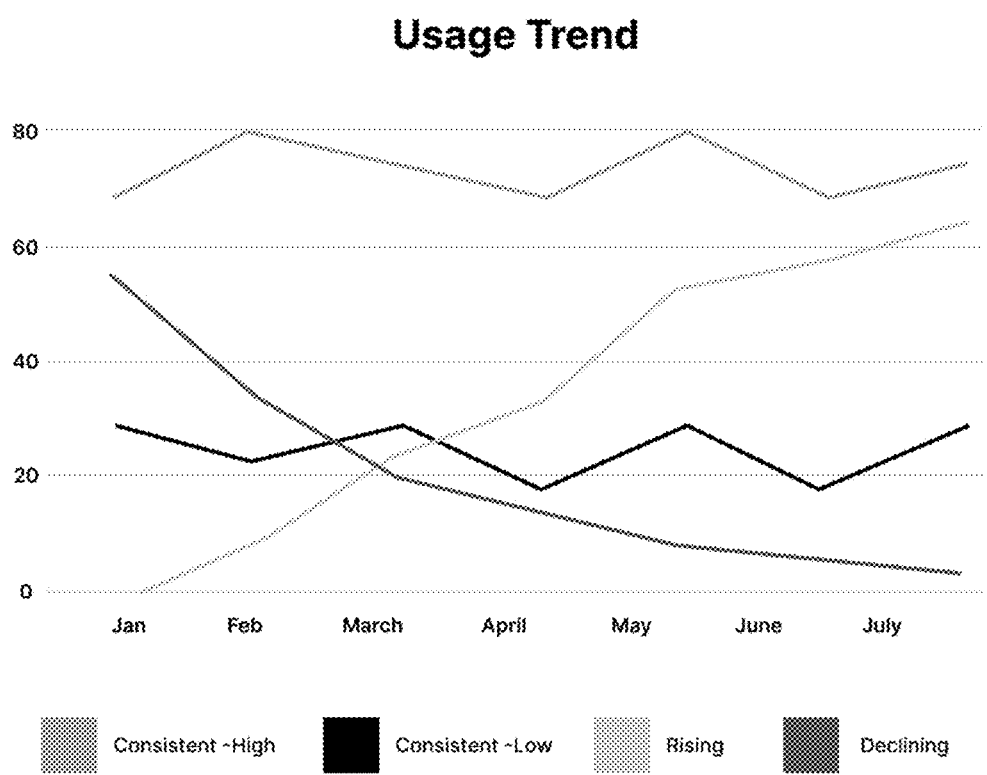
FIG. 3 illustrates an example of the usage score illustrating the usage trend over a period, in accordance with an embodiment of the present subject matter.

Referring to FIG. 3, an example of the usage score illustrating the usage trend over a period is shown. In the figure, consistent high depicts that an application brings value to the team consistently. The team is strongly dependent on the application for deliverables. The system may nudge to the admin to ensure that license costs are consistent with the trend for such applications. Further, a consistent low may depict that the application doesn't bring value to the team; or Application is valuable but used sparsely; or the application could be valuable, but there are roadblocks. In such scenario, the system may recommend to the admin to subscribe for lower tier licenses or suggest an alternate application or increase awareness. Further, a downward line depicts that the application's value has been on the decline. In an embodiment, when the system receives activity data from two similar applications, the system may predict that the employees have started using some alternate application. In such scenario, the system may generate an alert to the admin to decrease the licenses for the application. In an example, let us assume that an organization was using Application A related to communication in January and the organizational level usage score of Application is 80. Further, let's assume that in June the usage score of the Application is 30. Further, the system identifies (from the activity data) that the organization have adopted Application B related to communication category. Let's assume that the usage score of Application B is 60. The system may generate an alert to the admin to decrease the licenses for Application A because the employees have adopted alternate application (Application B).

Further, an upward line indicates that the the application is being adopted well by the users. The system may recommend to the admin to ensure that licenses are being migrated from pay-per-use to pay-as-you-go.

The pay-per-use pricing model means that users pay based on how much the users consume. The pay-as-you-go (PAYG) pricing model allows the users to make a one-time purchase for a product or service without subscribing to a regular monthly plan.

In an example, Let's assume that the score of a user for an application for three consecutive months has been X, Y, Z, then:

If $Z>Y>X$—It means that the user's engagement with the application has been on the rise, which could mean more the application adds value to the user.

If $Z<Y<X$—It could mean a gradual decrease in the application and the application is not adding value to the user.

If the scores remain more or less the same over months, it could mean that the application has been consistently being used to achieve certain regular objectives.

If the usage score is consistently 0, it means that the application is not used as it doesn't add any value to the user's day-to-day deliverables.

Exemplary embodiments discussed above may provide certain advantages. Though not required to practice aspects of the disclosure, these advantages may include those provided by the following features.

Some embodiments of the method and the system enable to calculate the usage score at a user level, a department level, and an organizational level.

Some embodiments of the method and the system enable continuously training the regression model as and when the activity data is received from the user. It may be noted that regression model is iteratively trained in order to accurately predict the usage score based on the activity data.

Some embodiments of the method and the system enable displaying the usage score to a user.

Some embodiments of the method and the system enable recommending training videos to users or employees of an organization having low usage scores.

Some embodiments of the method and the system enable recommending alternate application to an admin when the organizational level usage score for an application is less than a defined threshold.

Some embodiments of the method and the system enable calculating amount of expenditure at a user level for the applications that bill organizations according to the usage (pay per use).

Some embodiments of the method and the system enable inferring Tool Stack of an organization by comparing usage score of the organization with usage score of other organizations in the same industry.

Although implementations for methods and system for determining application usage have been described in language specific to structural features and/or methods, it is to be understood that the appended claims are not necessarily limited to the specific features or methods described. Rather, the specific features and methods are disclosed as examples of implementations for determining application usage.

The invention claimed is:

1. A method for determining application usage, the method comprising:
    receiving, by a processor, activity data for one or more applications from a plurality of sources in a raw format, wherein the activity data corresponds to information on one or more activities performed by a set of users with respect to the one or more applications;
    creating, by the processor, master data based on parsing the activity data;
    receiving, by the processor, organization data, department data, application data, and billing data from the plurality of sources;
    enriching, by the processor, the master data with the organization data, the department data, the application data, and the billing data to generate enriched master data;
    dynamically calculating, by the processor, weights for each source of the plurality of sources and for each activity of the one or more activities for an application from the one or more applications using a Machine Learning (ML) algorithm, wherein the weights are calculated by the ML algorithm based on a frequency of the activity data received from each source for each activity;
    training, by the processor, a regression model based on the enriched master data and the weights assigned to each source for each activity; and
    generating, by the processor, a usage score for the application at a user level, a department level, and an organizational level based on the trained regression model.

2. The method as claimed in claim 1, further comprises transforming the activity data into a standardized format using a fuzzy matching process.

3. The method as claimed in claim 2, wherein the transformation comprises at least matching non-standardized email or an identifier to a unique identifier for a user from the set of users and matching non-standardized application names to a unique application name.

4. The method as claimed in claim 1, wherein the organization data comprises a number of application integrations, a number of application licenses held by an organization, and a type of application licenses.

5. The method as claimed in claim 1, wherein the department data comprises information relating to one or more applications used by a particular department.

6. The method as claimed in claim 1, wherein the regression model is a Generalized Linear Model (GLM).

7. The method as claimed in claim 1, wherein the regression model is iteratively trained when new activity data streams are received.

8. The method as claimed in claim 1, wherein the activity data comprise at least application logs, a unique identifier related to the application, login information of a user from the set of users, demographic detail of the user, and license information of the application.

9. The method as claimed in claim 1, wherein the plurality of sources comprises Single Sign-on Integration (SSO), direct application integration, Browser Agents, Desktop Agents, and financial integration.

10. The method as claimed in claim 9, further comprises extrapolating activity data of an application used by an organization based on activity data of same application used by other organizations in same industry, when the activity data for the application used by the organization is not available from the direct application integration.

11. The method as claimed in claim 1, wherein the usage score is generated as a factor of at least one of a volume of activity of the application over time, a volume of logins of the application over time, a volume of usage of other applications, a volume of usage of other applications in same category, a volume of usage of the application across organizations in same industry, size of an organization, age of the organization, number of departments, applications to company ratio, applications to department ratio, payments of one or more months for the application, payments of the one or more months of the one or more applications, and department budget.

12. The method as claimed in claim 1, wherein the department level usage score provides significance of the application to a department from one or more departments present in an organization.

13. The method as claimed in claim 1, wherein the user level usage score provides a number of users using the application and a number of users not using the application frequently.

14. The method as claimed in claim 1, further comprises recommending training videos to users having less user-level usage scores.

15. The method as claimed in claim 1, further comprises recommending a new application to an admin when the organizational level usage score of the application is less than a defined threshold.

16. The method as claimed in claim 1, wherein the activity data received from the one or more applications comprises different activity data type, wherein the activity data type comprises login information, logout information, timestamp of an activity, count of messages, and count of attachment sent by a user in a period.

17. A system for determining application usage, the system comprising:
    a memory; and
    a processor coupled to the memory, wherein the processor is configured to execute program instructions stored in the memory for:
    receiving activity data for one or more applications from a plurality of sources in a raw format, wherein the activity data corresponds to information on one or more activities performed by a set of users with respect to the one or more applications;
    creating master data based on parsing the activity data;
    receiving organization data, department data, application data, and billing data from the plurality of sources;
    enriching the master data with the organization data, the department data, the application data, and the billing data to generate enriched master data;
    dynamically calculating weights for each source of the plurality of sources and for each activity of the one or more activities for an application using a Machine Learning (ML) algorithm, wherein the weights are calculated by the ML algorithm based on a frequency of the activity data received from each source for each activity;

training a regression model based on the enriched master data and the weights assigned to each source for each activity; and generating a usage score for the application at a user level, a department level, and an organizational level based on the trained regression model.

18. A non-transitory computer program product having embodied thereon a computer program for determining application usage, the computer program product storing instructions for:

receiving activity data for one or more applications from a plurality of sources in a raw format, wherein the activity data corresponds to information on one or more activities performed by a set of users with respect to the one or more applications;

creating master data based on parsing the activity data;

receiving organization data, department data, application data, and billing data from the plurality of sources;

enriching the master data with the organization data, the department data, the application data, and the billing data to generate enriched master data;

dynamically calculating weights for each source of the plurality of sources and for each activity of the one or more activities for an application using a Machine Learning (ML) algorithm, wherein the weights are calculated by the ML algorithm based on a frequency of the activity data received from each source for each activity;

training a regression model based on the enriched master data and the weights assigned to each source for each activity; and generating a usage score for the application at a user level, a department level, and an organizational level based on the trained regression model.

\* \* \* \* \*